(12) United States Patent
Rodrigues

(10) Patent No.: US 12,485,983 B2
(45) Date of Patent: Dec. 2, 2025

(54) PRODUCTION LINE, TROLLEY AND PROCESSING METHOD

(71) Applicant: ABB Schweiz AG, Baden (CH)

(72) Inventor: José Rodrigues, Bad Homburg (DE)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 18/350,276

(22) Filed: Jul. 11, 2023

(65) Prior Publication Data
US 2023/0348001 A1 Nov. 2, 2023

Related U.S. Application Data

(63) Continuation of application No. PCT/EP2021/050450, filed on Jan. 12, 2021.

(51) Int. Cl.
*B62D 65/18* (2006.01)
*B65G 37/02* (2006.01)

(52) U.S. Cl.
CPC ............ *B62D 65/18* (2013.01); *B65G 37/02* (2013.01)

(58) Field of Classification Search
None
See application file for complete search history.

(56) References Cited

U.S. PATENT DOCUMENTS

| | | | | |
|---|---|---|---|---|
| 4,241,646 A | * | 12/1980 | Tsuruta | B05B 16/60 454/52 |
| 4,653,387 A | * | 3/1987 | Osawa | B05B 16/95 454/53 |
| 5,005,487 A | * | 4/1991 | Ohmura | B65G 54/02 198/494 |
| 9,205,444 B2 | * | 12/2015 | Bhattacharya | F24F 11/0008 |
| 9,592,522 B2 | | 3/2017 | Schaefer | |
| 9,764,347 B2 | * | 9/2017 | Nudelman | B05B 16/60 |
| 10,589,307 B2 | * | 3/2020 | Colombaroli | B05B 16/40 |

(Continued)

FOREIGN PATENT DOCUMENTS

| | | | | |
|---|---|---|---|---|
| DE | 19630290 A1 | * | 1/1998 | ......... B05B 15/1207 |
| DE | 19630290 C2 | * | 8/2000 | ............ B05B 16/20 |

(Continued)

OTHER PUBLICATIONS

European Patent Office, International Search Report in International Patent Application No. PCT/EP2021/050450, 4 pp. (Oct. 8, 2021).

(Continued)

*Primary Examiner* — Kavel Singh
(74) *Attorney, Agent, or Firm* — Leydig, Voit & Mayer, Ltd.

(57) ABSTRACT

A production line for processing a workpiece in successive steps comprises a plurality of workstations, each of which is adapted for carrying out therein an associated one of said steps, and conveyor means for conveying the workpiece from one of said workstations to a successive one. At least the last one of said steps is a step of painting the workpiece. At least two workstations associated to steps immediately succeeding each other are not adjacent to each other. The conveying means comprise a trolley for transferring the workpiece from the first of said at least two workstations to the second, and the trolley comprises a dust-proof compartment for receiving the workpiece.

15 Claims, 3 Drawing Sheets

(56) References Cited

U.S. PATENT DOCUMENTS

| | | | |
|---|---|---|---|
| 10,676,283 B2 * | 6/2020 | Gümbel | B62D 65/18 |
| 10,870,125 B2 * | 12/2020 | Iglio | B05B 16/60 |
| 11,085,695 B2 * | 8/2021 | von Bargen | B05B 16/95 |
| 11,192,132 B2 * | 12/2021 | Koike | F24F 7/00 |
| 2020/0114384 A1 | 4/2020 | Schwab et al. | |

FOREIGN PATENT DOCUMENTS

| | | | | |
|---|---|---|---|---|
| EP | 0663686 A1 | 7/1995 | | |
| EP | 2018230 B1 * | 9/2015 | | B05B 13/0221 |
| JP | 2-123022 A | 5/1990 | | |
| JP | 4-146035 A | 5/1992 | | |
| JP | 7-72012 B2 | 8/1995 | | |
| JP | 7-221170 A | 8/1995 | | |
| JP | 2003-154296 A | 5/2003 | | |
| KR | 10-2017-0045158 A | 4/2017 | | |

OTHER PUBLICATIONS

European Patent Office, Written Opinion in International Patent Application No. PCT/EP2021/050450, 6 pp. (Oct. 8, 2021).

* cited by examiner

Fig. 1
prior art
Fig. 2
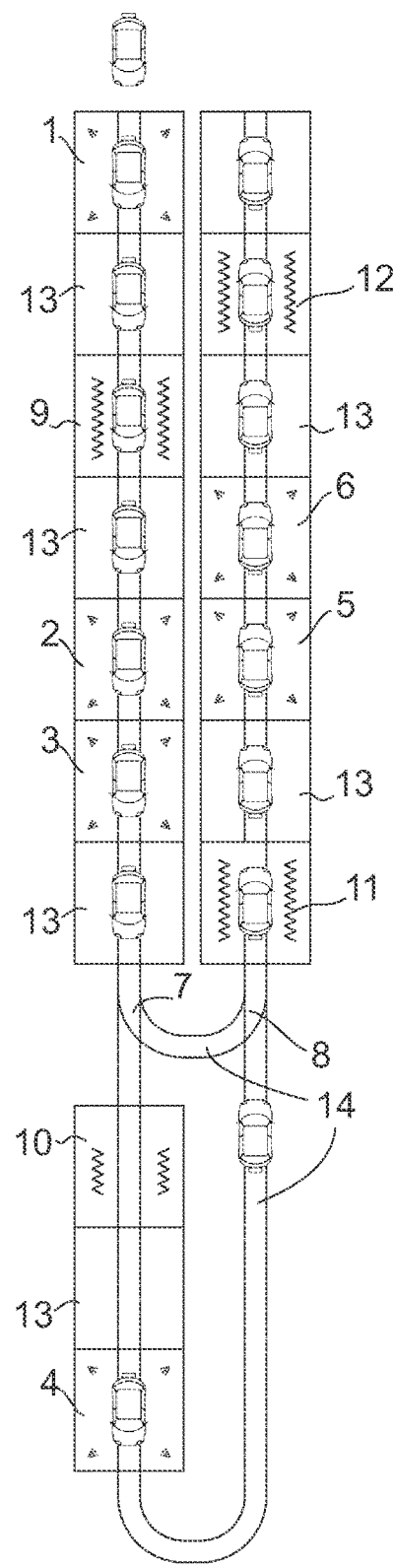
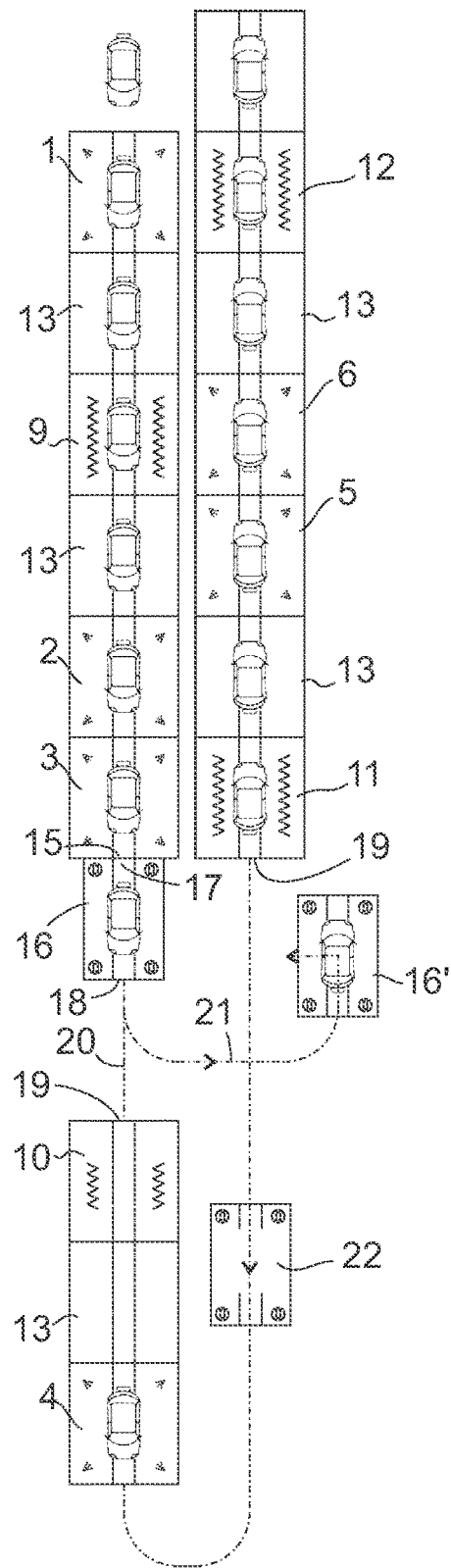

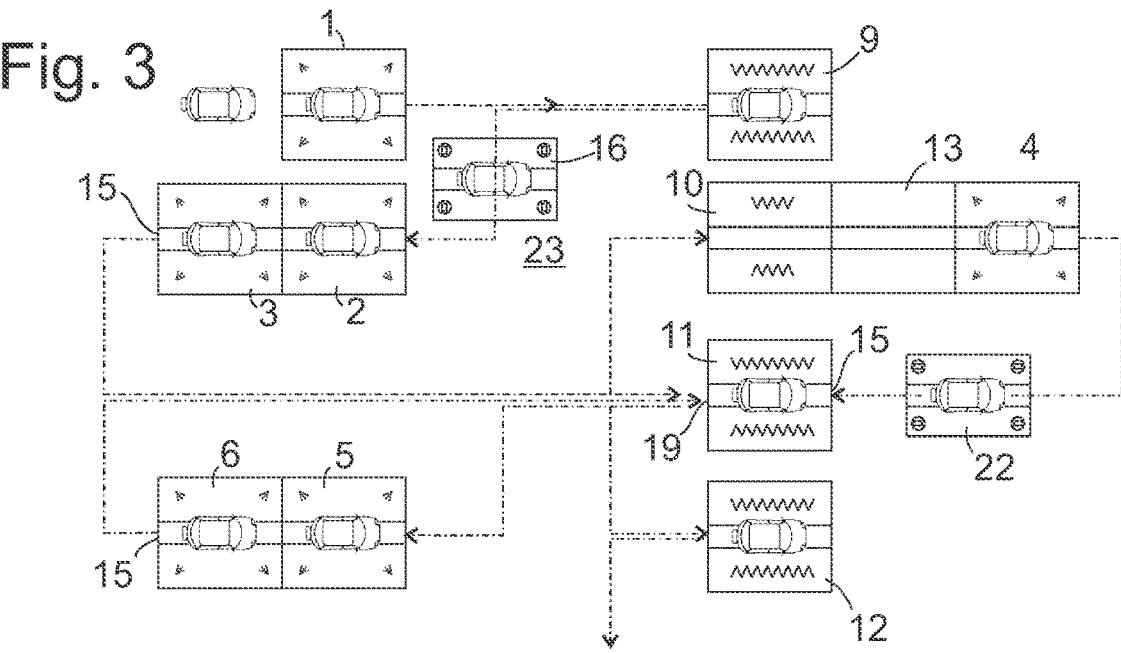
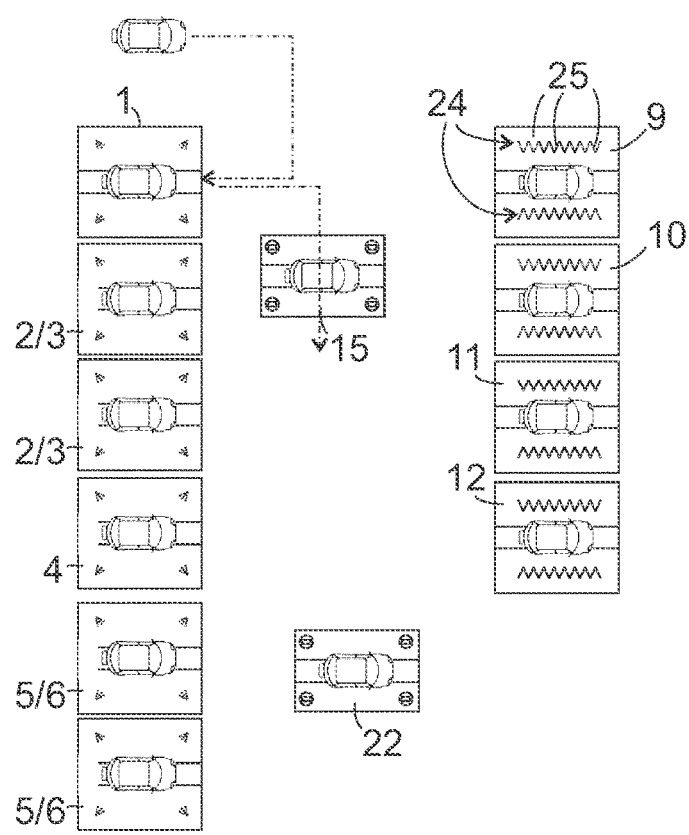

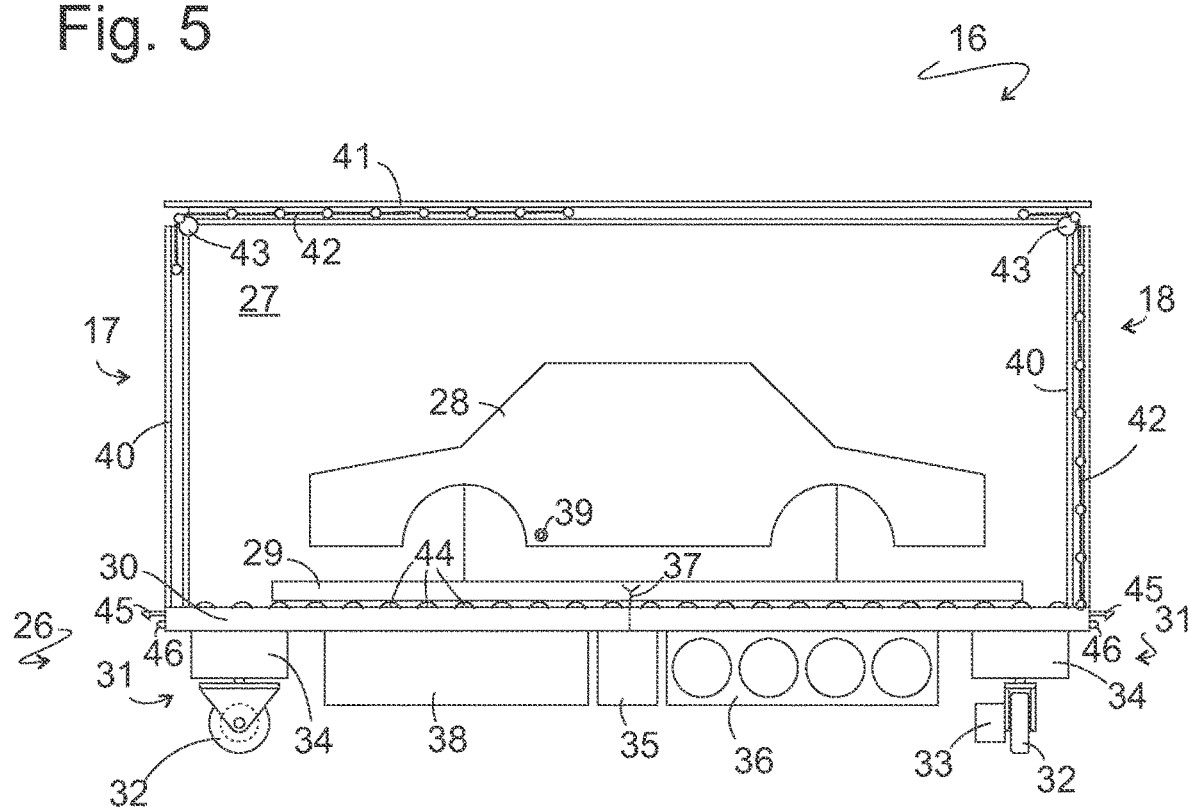

PRODUCTION LINE, TROLLEY AND PROCESSING METHOD

CROSS-REFERENCE TO RELATED APPLICATIONS

The instant application is a continuation of International Patent Application No. PCT/EP2021.050450, filed on Jan. 12, 2021, which is incorporated herein in its entirety by reference.

FIELD OF THE DISCLOSURE

The present disclosure generally relates to a production line and to a method for processing a workpiece into a finished article, and to a trolley for use in the production line or the method.

BACKGROUND OF THE INVENTION

Since the introduction of the assembly line, it has been a paradigm that for cost-effective mass production, workpieces shall be subjected to identical processing steps by being conveyed from one workstation, where one processing step is carried out, to a next workstation, where a next processing step is carried out, thus applying identical processing steps to all workpieces and outputting identical finished articles at the last one of the work-stations. Ideally, such workstations will be adjacent to each other, so that a workpiece, after having been processed in one workstation, can be forwarded to the next with minimum loss of time.

Computer control has allowed more flexible production schemes, in which workpieces may be conveyed along different paths between workstations, thus enabling a workpiece to bypass a workstation whose processing step is not required for that particular workpiece. A problem arises, however, when at least one of the processing steps is a painting step, since then the workpiece must reliably be prevented from gathering dust along any path it might be conveyed, no matter how seldom that path might be used, both before the painting step and afterwards, while the paint is not yet perfectly dry or cured.

This problem is particularly relevant when the workpiece is a car body, on the one hand since its size makes shrouding all possible paths difficult, on the other since rising demand for individual designs sporting e.g. different types of color or finish in different regions of a car body, increase the number of processing steps that may be needed for finishing a car body.

BRIEF SUMMARY OF THE INVENTION

Embodiments of the present disclosure describe systems and methods that ensure dust protection of a workpiece between workstations even if paths from one workstation to the next can vary from one workpiece to another, and even if such paths cross each other.

According to a first aspect of the disclosure, a production line for processing a workpiece in successive steps is described, the production line comprising a plurality of workstations, each of which is adapted for carrying out therein an associated one of said steps, and conveyor means for conveying the workpiece from one of said workstations to a successive one, wherein at least the last one of said steps is a step of painting the workpiece, and wherein at least two workstations associated to steps immediately succeeding each other in the processing of said workpiece are not adjacent to each other, the conveying means comprise a trolley for transferring the workpiece from the first of said at least two workstations to the second, and wherein the trolley comprises a dust-proof compartment for receiving the workpiece.

To protect the workpiece while transferring it between the trolley and a workstation, the compartment should have at least one port adapted to be coupled in a dust-proof manner to mating ports of the first and second workstations. When the trolley comprises means for pressurizing the compartment, entry of dust into the compartment can be prevented even if the compartment isn't hermetically sealed, since air escaping through gaps of the compartment will prevent dust from entering through these or through the at least one port.

The ports of the trolley and/or of the workstations preferably comprise a slidable door. Slidable doors can be opened after the ports of the trolley and of the workstation have been placed in mating relationship, so that entry of dust through gaps between the ports can be minimized or can be prevented altogether by a slightly positive pressure in the compartment and/or the workstation.

In one embodiment, the door includes a flexible sheet. By displacing the sheet continuously around an edge of the compartment from a face side facing the workstation to e.g., a sidewall or a roof of the compartment, the slidable door can fill almost the entire face side and can nevertheless be opened without increasing the dimensions of the trolley.

To facilitate loading and unloading workpieces, the trolley may comprise a rail portion for displaceably supporting the workpiece. When this rail portion is coupled to a rail of a workstation, the workpiece can be transferred easily and smoothly along the rail and the rail portion.

In the production line, more than two workstations should have ports by which a workpiece can be transferred to or received from the trolley. Thus, the trolley can take up a workpiece at the port of one workstation and choose a workstation to which the workpiece is to be delivered or collect workpieces from several workstations and deliver these to a same target workstation.

The plurality of workstations to which the workpiece can be delivered or collected can be a subset whose workstations are all associated to a same one of the method steps. By providing such workstations in a number proportional to the time they need to carry out their associated method step, idle times of the workstations can be minimized, and productivity maximized.

Productivity is further improved when the trolley, in its unloaded state, is adapted to identify a workstation of the subset that has finished or is about to finish a first method step associated to it, to navigate to said workstation and to be loaded there with the workpiece after said first method step has been finished on it.

Analogously, the trolley may be adapted to, when loaded, identify a next method step to be carried out on the workpiece, to identify a next workstation associated to said next method step and to drive the workpiece to said next workstation.

BRIEF DESCRIPTION OF THE SEVERAL VIEWS OF THE FIGURES

FIG. 1 is a schematic diagram of a conventional production line in accordance with the disclosure.

FIG. 2 is a schematic diagram of a first production line in accordance with the disclosure.

FIG. 3 is a schematic diagram of a second production line in accordance with the disclosure.

FIG. 4 is a schematic diagram of a third production line in accordance with the disclosure.

FIG. 5 is a diagram of a trolley used in the production lines of FIGS. 2, 3 and 4.

DETAILED DESCRIPTION OF THE INVENTION

FIG. 1 is a schematic diagram of a conventional production line for painting car bodies. Workstations of the production line comprise paint stations 1-6. Paint station 1 is for applying a primer to the white car body, stations 2 and 3 for applying a base coat to an inside and an outside of the car body, respectively, and stations 5, 6 for applying a clear coat inside and outside.

While for painting a car body in a single color, paint stations 1-3, 5 and 6 will be sufficient, a further paint station is necessary if a customer's wish for a multicolor body is to be satisfied, e.g., if the roof is to have a color different from the rest of the car body. Integrating such a further paint station into a linear path of the car bodies would lead to an increase in processing time for all car bodies and would leave the further paint station idle most of the time. Therefore, the production line of FIG. 1 provides a track switch 7 where a car body can be sent to paint station 4, if required, whereas all others go straight to paint stations 5, 6, and a track switch 8 where paths of the car bodies having undergone painting in station 4 and of those that haven't reunite.

When one layer of paint has been applied, and before applying a next one, the car bodies are flashed, i.e., volatile components of the layer are given time to evaporate, and baked. The production line of FIG. 1 therefore has baking stations 9 between paint stations 1 and 2, 10 between paint stations 3 and 4, 11 between track switch 8 and paint station 5 and 12 behind paint station 6. Flashing stations 13 are provided between stations 1 and 9, stations 9 and 2, station 3 and track switch 7, and various other places as shown in FIG. 1.

Due to the track switches 7,8, not all stations of the production line can be directly adjacent and sealably coupled to each other. Wherever tracks 14 for conveying the car bodies extend outside a workstation, they have to be tightly shrouded in order to ensure that no dust will settle on the car bodies during conveyance.

FIG. 2 illustrates a production line according to the invention. The work-stations of this production line are the same as in FIG. 1, and the steps of the painting process carried out by them is also identical. Therefore, the same reference numerals as in FIG. 1 will be used for the workstations, and their description will not be repeated here.

As in FIG. 1, there are three groups of adjacent workstations, the first comprising paint stations 1, 2, 3 and baking station 9, the second comprising baking station 10 and paint station 4, and the third comprising paint stations 5, 6 and baking stations 11, 12. Between the groups, no tracks are provided. Instead, there is a flat floor surface between the groups where vehicles can move freely in two dimensions, unconstrained by tracks.

Paint station 3 has an outlet port 15 for ejecting a car body after having applied the base coat to its outside. A trolley 16 is shown coupled to the outlet port 15 for receiving the car body. When the car body has been loaded on the trolley 16, the trolley 16 drives it to the next station where the car body is to be processed. In the case shown, this is either baking station 11 or baking station 10. There is no flashing station at the outlet side of paint station 3, since the time the car body spends being ferried on board the trolley serves the purpose of a flashing stage.

The trolley 16 has an inlet port 17 for coupling to the outlet port 15 of paint station 3, and an outlet port 18 opposite the inlet port 17, which can be coupled to inlet ports 19 of baking stations 10 or 11, in order to unload the car body.

Ports 15, 19 of workstations 3, 10 face each other, so that the trolley 16 can move from one to the other along a straight line 20, whereas moving from the paint station 3 to baking station 11 involves a U-turn 21. In FIG. 2, the U-turn 21 is wider than necessary to reach workstation 11, at the end of the U-turn, a second image 16' of trolley 16 is shown in a parking position laterally offset with respect to inlet port 19 so that another trolley 22 can finish unloading a car body into workstation 11 and then move away. Such a situation may arise since when a car body has been processed in paint station 4, it and the next car body finished by paint station 3 will compete for a place in baking station 11. Use of the trolley allows to keep one (or more) car bodies waiting for admission to baking station 11, whenever the need arises.

FIG. 3 illustrates a second embodiment of a production line which exploits the possibilities offered by the trolleys more systematically than that of FIG. 2. There is only one flashing station 13 left in this production line; all others have been replaced by trolleys. While only two trolleys 16, 22 are shown in FIG. 3, their number may be larger, as necessary, e.g., to serve as temporary storage for car bodies that have to wait for a next processing step. The number of trolleys is smaller than the number of flashing stations 13 in FIG. 2, since times needed for flashing are shorter than those for painting or baking. Thus, one trolley, by transporting car bodies between more than one pair of stations, can replace more than one flashing station, saving space and cost.

Painting stations 1-6 are identical to those of FIGS. 1 and 2 and serve the same purpose. Obligatory paint stations 1-3, 5 and 6 are located on one side of a central corridor 23, facultative paint station 4 and baking stations 9-12 on the other. When primer has been applied to a car body in paint station 1, one of the trolleys 16, 22 will come and shuttle it across the corridor 23 to baking station 9. Trolley 16 is shown carrying a car body from baking station 9 to paint station 2. Since paint stations 2, 3 are arranged in line, the trolleys have to fetch a car body that got its base coat applied in stations 2, 3 at the outlet port 15 of station 3 facing away from corridor 23 and convey it from there to one of baking station 11 or, if the body is to be painted in more than one color, baking station 10.

Baking station 10, flashing station 13 and paint station 4 are arranged adjacent to each other so that a car body that was delivered to baking station can be conveyed to paint station 4 without the use of a trolley. Trolley 22 is shown fetching a car body from paint station 4 and delivering it to baking station 11. Alternatively, it might deliver it once more to baking station 10. By thus sending the car body once more through paint station 4, as many different colors as desired can be applied to parts of the car body, with no additional investment in machinery required.

Trolley 22 is delivering its car body to a port 15 of baking station 11 facing away from corridor 23, since, coming from paint station 4, it is the fastest and easiest port to reach. I.e. every port 15, 19 of station 11 can serve both as an inlet or an outlet port, as needed.

If at the time when trolley 22 has to deliver its car body, baking station 11 is occupied while baking station 12 is not, trolley 22 is adapted to detect the fact and to deliver to baking station 12 instead.

When a car body that previously passed through paint stations 2, 3 and, eventually, 4, is taken out of baking station 11, it is conveyed to paint station 5 by a trolley not shown. From the outlet port 15 of paint station 6, it is conveyed back to any of baking stations 11, 12 that happens to be free. After treatment in this last baking station, the painting process is finished, and the car body is conveyed to a subsequent assembly line.

FIG. 4 illustrates a further optimized embodiment of the production line. Here, all transport of the car bodies is done by the trolleys, from loading the white body into paint station 1 to unloading the fully painted body from one of the baking stations. Pairs of stations 2, 3 and 5, 6 for painting inside and outside of the car bodies have been replaced by combined stations 2/3 and 5/6, respectively, each of which is designed to paint inside and outside. Since the time required for processing a car body in each of the combined stations 2/3 and 5/6 is longer than in the single-function stations 2, 3 and 5, 6 of the previous embodiments, more than one of each type is provided. Thus, a processed car body can be unloaded from one of e.g., stations 2/3 and replaced by a new one while the other is occupied processing one car body, and one trolley 16 or 22 is sufficient to serve them both.

Paint stations 1, 2/3 and 5/6 and baking stations 9-12 are disposed at opposite sides of corridor 23. All are loaded and unloaded through ports facing the corridor 23. Since it is no longer necessary to convey the car bodies through the workstations, conveying means of the workstations can be dispensed with; it is sufficient if the trolleys have conveying means with an operating range sufficient to place a car body appropriately within the workstations 1-6, 9-12 and to withdraw it from there.

At least some of the baking stations 9-12, e.g., stations. 9 and 10, have heaters 24 that are displaceable or have independently controllable segments 25 in order to apply heat locally to a part of a car body that is to receive a further paint layer on top of the base coat in paint station 4. Thus, when a car body is taken out from one of stations 2/3 and is destined for paint station 4, the trolley will have to take it to one of stations 9, 10; else it can take it to any one of baking stations 9-12 that is or will soon be available. Also, car bodies that are removed from stations 4 or 5/6 can be baked in any of stations 9-12.

FIG. 5 is a schematic view of one of the trolleys, e.g. trolley 16. The trolley has an undercarriage 26 which supports a box shaped compartment 27 for receiving a car body 28 on a substructure 29. The undercarriage 26 comprises a rectangular chassis 30 with four casters 31 at its corners. Each caster 31 comprises a wheel 32, a first electric motor 33 driving the wheel 32, and a second motor 34 for rotating the wheel 32 and its associated motor 33 around a vertical axis. Motors 33, 34 of the four casters 31 are controlled independently by an on-board computer 35, enabling the trolley to drive in curves, to rotate on the spot or to change its direction of displacement arbitrarily while maintaining its orientation.

The undercarriage further carries means 36 for pressurizing compartment 27 by dust-free air and a battery pack 38 for powering the motors 33, 34, the computer 35 and the pressurizing means 36. The pressurizing means 36 may comprise a fan and filter assembly designed to intake outside air, to filter it and to blow it into the compartment 27. They may comprise an air conditioner for heating and/or cooling air fed into compartment 27, and/or for controlling its humidity according to the requirements of the most recent coating of the car body the trolley is conveying. Air fed to the compartment 27 by the air conditioner may be fresh air drawn in from outside the compartment, or recirculated air from the compartment itself.

The computer 35 has a wireless interface 37 for communication with other computers of the production line and with a transponder 39 attached to the car body 28.

The compartment 27 is delimited by pillars 40 at its four corners, by a roof 41 carried by the pillars 40 and by sidewalls extending between the pillars 40 along the two longer sides of the chassis 30. At the two shorter sides, slidable doors serve as inlet and outlet ports 17, 18. Leaves of the doors are flexible or articulate, so that the doors can be opened without the door leaves protruding beyond the outline of the compartment 27. For example, the door leaves may be formed as a roller blind 42 that is guided in grooves of the pillars 40 and can be raised and lowered by rotation of a sprocket 43 controlled by computer 35. The left port 17 is shown in an open state in which most of the roller blind 42 extends along the roof 41; the right-hand port 18 is closed with an end of the roller blind 42 touching the chassis 30.

When the trolley 16 is in an idle state, computer 35 scans for wireless messages indicating a workstation where a car body is ready for transport or will soon be. The requester sending such a message may be the workstation itself or a central computer controlling operation of the workstations. When a message is received, trolley 16 calculates the distance or the time needed to reach the workstation and places a bid indicating the result.

Among several such bids, requester chooses the one from the trolley where distance or time is smallest and send a return message to said trolley 16 indicating that its bid is accepted. The trolley 16 then navigates to the work-station indicated, and docks one of its ports 17, 18 to a port of the workstation.

When facing ports of the workstation and of the trolley open, a positive pressure in compartment 27, upheld by pressurizing means 36 ensures that air will blow out through gaps between the ports, so that no dust can reach the compartment 27 while car body 28 and substructure 29 are transferred into it. After having received the car body, port 17 closes again.

Displacement of the car body 28 within compartment 27 may be facilitated by a plurality of rollers 44 rotatably mounted in an upper surface of chassis 30 for supporting the substructure 29. For actively moving the car body, some of the rollers may be motorized.

Instructions concerning the destination of the car body can be provided directly by the central computer. Alternatively, the computer 35 retrieves from transponder 39 either an identifier which it can use to query the processing status of the car body from the central computer, or it retrieves the processing status of the car body directly from its transponder 39.

The processing status identifies steps of the painting process to be applied to the car body 28, their order of execution, the workstations in which they are carried out and, where appropriate, processing data such as an identifier of a color to be applied, a region of the car body where the color is to be applied, and the like. Whenever a particular step of the painting process has been carried out, it is labeled as done in the processing status. Based on this processing status, the computer 35 identifies the next step to be carried out, and the workstations capable of carrying it out. It then sends a request for allocation of a processing time slot to all these. The workstations respond by communicating their next available time slot, and the computer 35 chooses the one requiring least waiting time, sends a reply message booking this time slot and sets out to bring the car body 28 to the workstation it has booked. In the meantime, the pressurizing means 36 is working continuously.

Docking to that workstation can be done by either port 17 or 18. The trolley can be provided with a mechanical coupling 45, e.g. a pivotable hook, adapted to lock to a mating contour of the workstation by a positive fit when the trolley approaches the workstation, which will prevent the trolley from moving relative to the workstation while a car body is being transferred between the two. Further, an electrical connector 46 can be provided by which, while the trolley is docked to the workstation, mains electric power is transferred to it via the workstation. Energy-intensive tasks of the trolley such as transferring the car body between the workstation and the trolley, heating or cooling the compartment 27 may be enabled only while the trolley is thus connected to power mains. Thereby, battery load is reduced, and the productivity of the trolley is improved since the fraction of its operating time spent charging the battery is reduced. Times the trolley spends connected to a workstation may even be used for recharging the battery.

After the car body 28 has been discharged, the trolley 16 returns to the idle state, and the above-described process is repeated.

REFERENCE NUMERALS 1-6 workstation (paint station)
7-8 track switch
9-12 workstation (baking station)
13 workstation (flashing station)
14 track
15 outlet port
16 trolley
17 inlet port
18 outlet port
19 inlet port
20 straight line
21 U-turn
22 trolley
23 corridor
24 heater
25 segment
26 undercarriage
27 compartment
28 car body
29 substructure
30 chassis
31 caster
32 wheel
33, 34 motor
35 computer
36 pressurizing means wireless interface
38 battery pack
39 transponder
40 pillar
41 roof
42 roller blind
43 sprocket
44 roller
45 mechanical coupling
46 electrical connector Preferably, the trolley is adapted to select, as said next workstation, one from a subset of workstations associated to said next method step which is free or is about to finish processing another workpiece, so that the workpiece carried by the trolley can be unloaded there with minimal waiting time.

In order to minimize idle time of a workstation, the workstation should have at least two ports to which a trolley can be coupled, so that loading a processed workpiece on one trolley and unloading the next workpiece to be processed from another trolley can take place simultaneously at different ports.

For the trolley, it is also advantageous to have a plurality of ports in order to minimize the amount of maneuvering needed for coupling to a workstation port. Preferably, there are two ports provided at opposite sides of the dustproof compartment.

To enable the trolley to identify a next method step to be carried out on the workpiece loaded into it and to identify a target workstation for said workpiece, each workpiece should have associated to it a schedule of method steps to be carried out on it, which is accessible to the trolley.

For accessing the schedule, the trolley may comprise a reader, for example a RFID reader, for reading data from a data carrier of a workpiece. The data may comprise the schedule itself, or a reference by which the schedule can be retrieved from a database.

Each workstation may have a recording device associated to it for writing into the schedule of a workpiece processed by it a record identifying the workstation and/or its associated method step, so that when the workpiece is loaded onto a trolley, the trolley can find out the next method step due to be carried out on the workpiece, and find an appropriate workstation to deliver the workpiece to.

According to a second aspect of the invention, this object is achieved by trolley for use in the production line described above, the trolley comprising a steerable undercarriage, a pressurized compartment having at least one port for loading a workpiece into the compartment and unloading the workpiece.

For good maneuverability the undercarriage may comprise a plurality of casters that are drivable independently and are rotatable around a vertical axis.

The trolley may further comprise a mechanical coupling for locking engagement with the workstation.

According to a third aspect of the invention, this object is achieved by a method of processing a workpiece in successive steps, wherein each method step is carried out in an associated workstation, and between at least two of said workstations the workpiece is conveyed by the trolley as described above.

Further features and advantages of the invention will become apparent from the subsequent description of embodiments, referring to the appended drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A production line for processing a workpiece in successive steps, the production line comprising:
    a plurality of workstations, each workstation of the plurality of workstations being configured to carry out an associated one step of the successive steps; and
    at least one trolley configured to convey the workpiece from a first workstation of the plurality of workstations to a second, successive workstation of the plurality of workstations, each trolley of the at least one trolley comprising a dust-proof compartment configured to receive the workpiece, each dust-proof compartment comprising a first port disposed at a first side of the dust-proof compartment, and a second port disposed at a second side of the dust-proof compartment, the second side being opposite the first side,
    wherein at least one of the first port and the second port of each dust-proof compartment is configured to be coupled in a dust-proof manner to at least one of a mating port of the first workstation and a mating port of the second workstation,
    wherein at least a last one of the successive steps is a step of painting the workpiece, and
    wherein at least two workstations associated to steps immediately succeeding each other are not adjacent to each other.

2. The production line of claim 1, wherein each trolley is configured to pressurize the dust-proof compartment.

3. The production line of claim 1, wherein at least one of the first port and the second port of each trolley and/or at least one mating port of at least one workstation of the plurality of workstations comprises a slidable door.

4. The production line of claim 3, wherein the slidable door comprises a flexible sheet.

5. The production line of claim 1, wherein each trolley comprises a rail portion for displaceably supporting the workpiece.

6. The production line of claim 5, wherein the rail portion is adapted to be coupled to a rail of at least one workstation of the plurality of workstations.

7. The production line of claim 1, wherein more than two workstations of the plurality of workstations have mating ports by which a workpiece is transferrable or receivable from the at least one trolley.

8. The production line of claim 1, wherein the plurality of workstations comprises at least one subset of plural workstations associated to a same one step of the successive steps.

9. The production line of claim 8, wherein each trolley is configured to, when unloaded, identify a workstation of the subset of plural workstations that has finished or is about to finish a first method step associated with the workstation, and to be loaded with the workpiece after completion of the first method step.

10. The production line of claim 9, wherein each trolley is configured to, when loaded, identify a next method step of the successive steps to be carried out on the workpiece, so as to identify a next workstation associated with the next method step and to drive the workpiece to the next workstation.

11. The production line of claim 10, wherein each trolley is configured to select, as the next workstation, one workstation from the subset of plural workstations associated with the next method step that is free or is about to finish processing another workpiece.

12. The production line of claim 1, wherein at least one workstation of the plurality of workstations has at least two mating ports to which the at least one trolley is configured to be coupled.

13. The production line of claim 1, wherein the workpiece has an associated schedule of successive steps to be carried out on the workpiece, and
    wherein the at least one trolley is configured to identify a target workstation of the plurality of workstations for the workpiece based on the associated schedule.

14. The production line of claim 13, wherein the at least one trolley comprises a reader configured to read data from a data carrier of the workpiece, the data comprising the schedule, or a reference by which the schedule is retrievable.

15. The production line of claim 1, wherein the at least one trolley includes:
    a steerable undercarriage, and
    a pressurized compartment having at least one of the first port and the second port so as to permit at least one of loading the workpiece into, and unloading the workpiece from, the pressurized compartment.

* * * * *